United States Patent [19]
Hickman et al.

[11] Patent Number: 5,619,025
[45] Date of Patent: Apr. 8, 1997

[54] METHOD FOR TAMPER-PROOF IDENTIFICATION USING PHOTOREFRACTIVE CRYSTALS

[75] Inventors: Joel Hickman, Concord; Scott Phillips, Hercules; Colin Brady, San Jose, all of Calif.

[73] Assignee: Network Security Technologies, Berkeley, Calif.

[21] Appl. No.: 238,429

[22] Filed: May 5, 1994

[51] Int. Cl.⁶ .................................................. G06K 7/10
[52] U.S. Cl. .......................... 235/454; 235/380; 235/382; 235/487
[58] Field of Search ................................... 235/380, 382, 235/454, 487

[56] References Cited

U.S. PATENT DOCUMENTS 4,476,468 10/1984 Goldman .................................. 235/380
4,599,509 7/1986 Silverman ................................ 235/382

*Primary Examiner*—Harold Pitts
*Attorney, Agent, or Firm*—Harris Zimmerman

[57] ABSTRACT

A method and apparatus for document verification exploits a temporally variable physical process to generate a reproducible effect that cannot be copied. A document such as a credit card is provided with a spot or stripe that incorporates at least one, and preferably a large plurality of photorefractive crystals arrayed in a random manner. The document verifying apparatus includes a coherent light source such as a diode laser to illuminate the photorefractive crystals, and a photosensor to receive light scattered from the photorefractive crystals. The random distribution and orientation of photorefractive crystals comprises a unique characteristic for each card or document, and this characteristic is not based on any assigned number or code. The response of photorefractive crystals to the coherent illumination comprises a time-varying characteristic that is dependent upon the intensity and temporal nature of the illumination itself. Input to the laser illuminator may be varied to elicit differing responses from the photorefractive crystals, and this factor may be very difficult for a counterfeiter to ascertain. Also, for any given illumination intensity or temporal pattern, the image received by the photosensor varies with time. The time at which the photosensor signal is sampled to obtain an identifying image may also be varied, thereby further compounding the difficulty for a counterfeiter to overcome. A large number of "snapshots" of the time-varying image of the document is electronically captured, digitized, and stored in an electronic media. The photosensor signal is compared to the stored data; a match indicates a valid document, and no match indicates an invalid or unauthorized document. The image recognition process can be enhanced by comparing the rate of change in a sequence of images elicited by the laser illuminator.

23 Claims, 3 Drawing Sheets

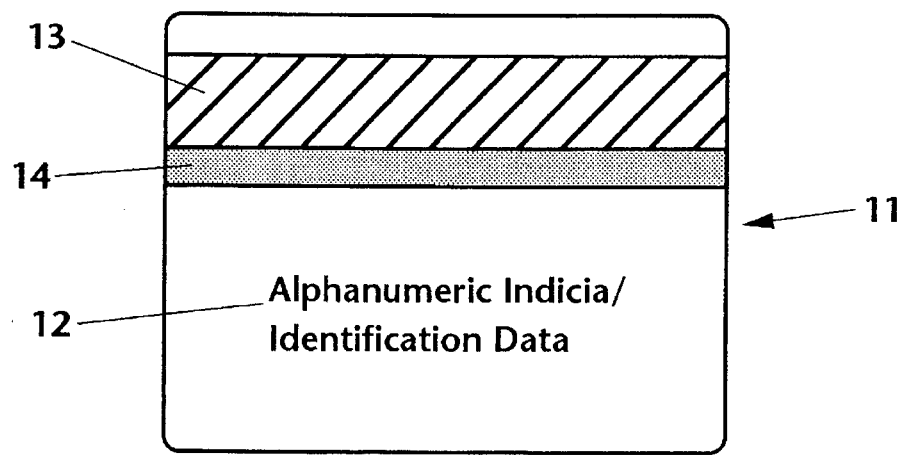
Figure_1
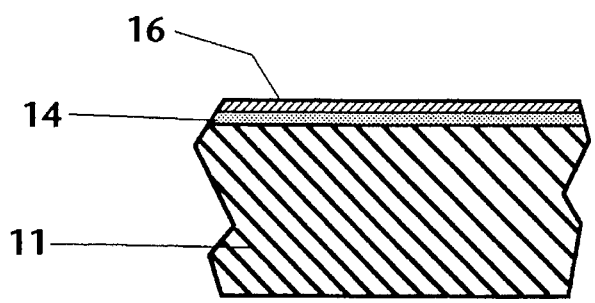
Figure_2
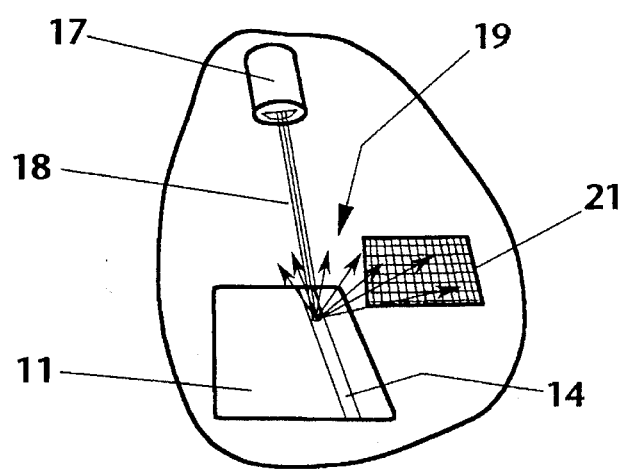
Figure_3

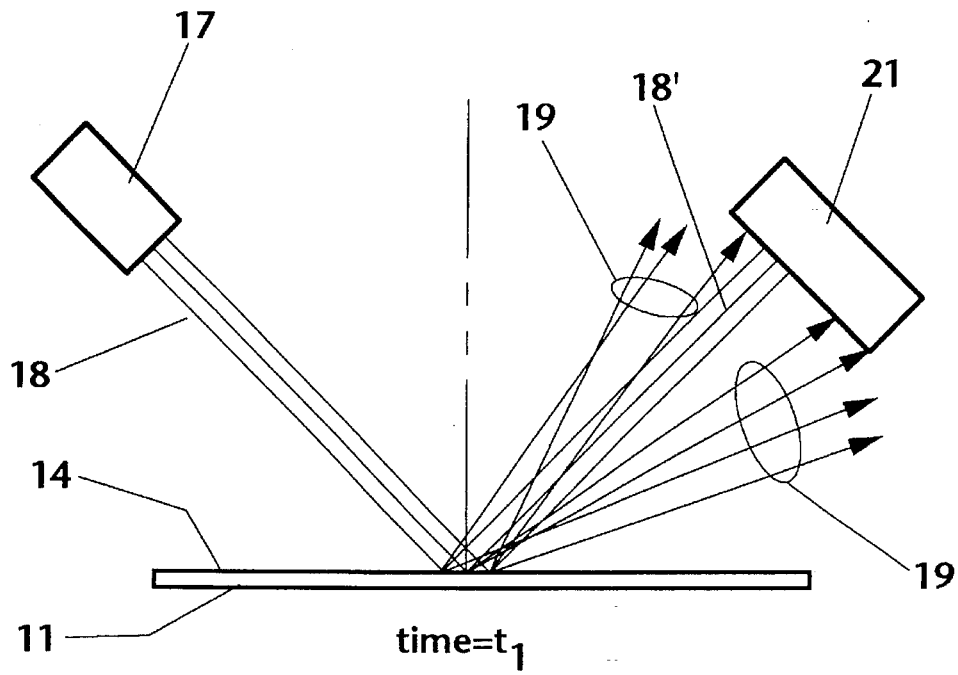
Figure_4
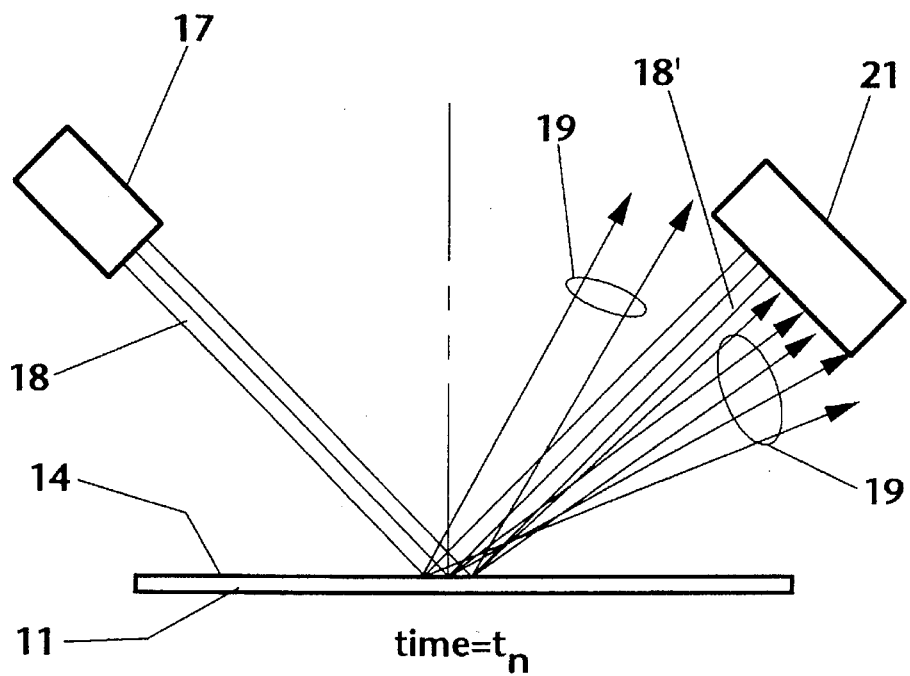
Figure_5

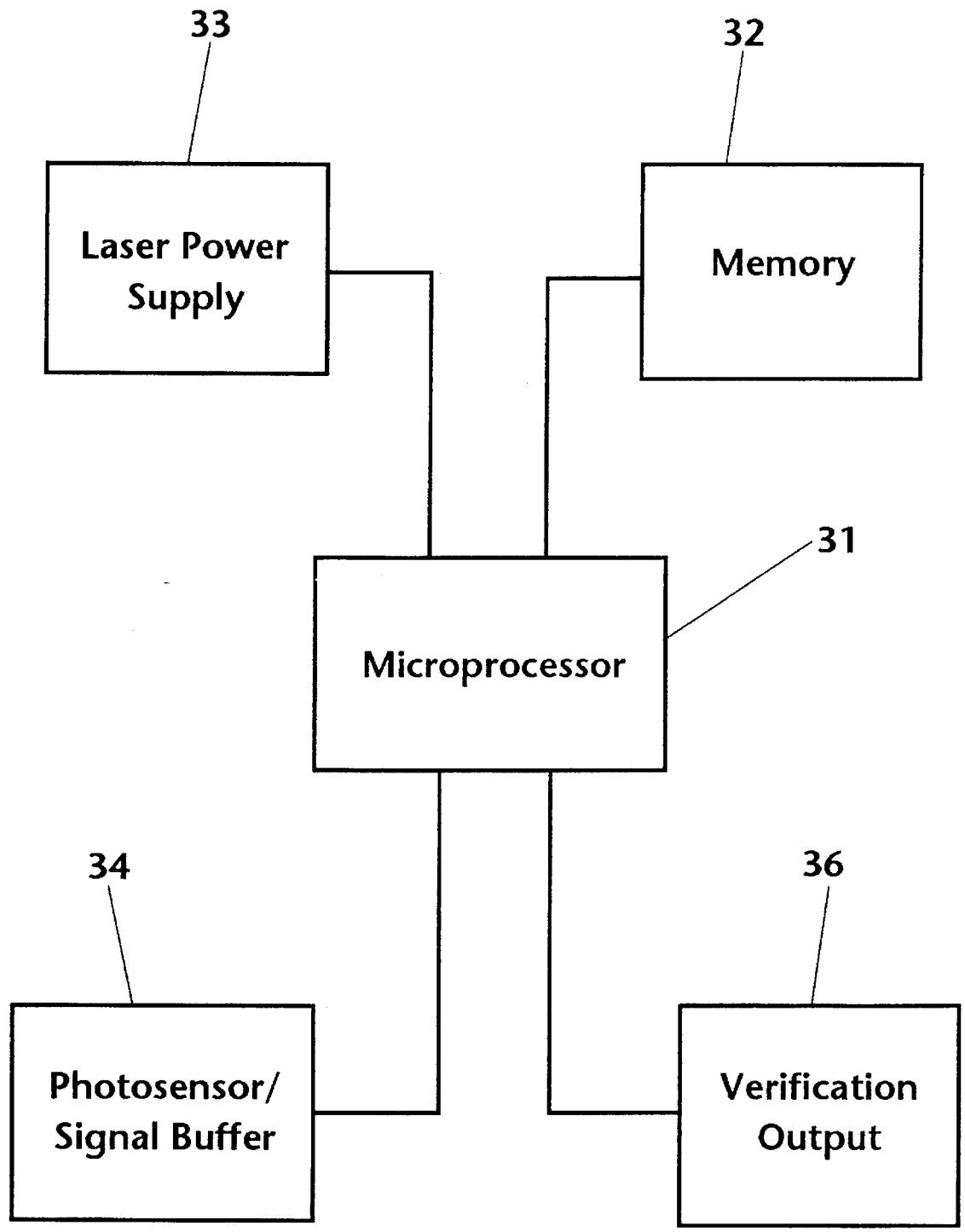
Figure_6

5,619,025

METHOD FOR TAMPER-PROOF IDENTIFICATION USING PHOTOREFRACTIVE CRYSTALS

BACKGROUND OF THE INVENTION

This invention relates to identification and verification systems in general, and more particularly card verification systems for credit cards, automatic teller machine cards, entry control for premises, identification cards for institutions and employers, and the like.

Commercial transactions have evolved from rudimentary forms involving exchange of objects, such as barter and monetary systems using valuable metals to intermediate monetary systems employing tokens such as paper money, to complex forms in which tokens are eliminated and payment is transferred electronically and instantly. As commercial systems have become more sophisticated, greater financial power has been concentrated in increasingly smaller objects, such as credit card and bank cards. This concentration of wealth in singular objects has created great opportunities for fraud and deceit, and these opportunities have been exploited by unscrupulous criminals. Thus there has developed a growing need for verification and identification of the parties involved in commercial and monetary transactions.

Credit card systems have adopted measures that improve security by making counterfeiting difficult or inconvenient, but not impossible. For example, raised or embossed indicia incorporated in the cards make casual copying difficult, but counterfeiters have acquired devices for re-embossing existing cards as well as embossing bogus cards, and this measure is now generally considered ineffective. Likewise, the ubiquitous magnetic stripe bearing encoded verification data has been compromised by simple counterfeiting schemes that re-write false data in the stripe. Even the personal identification number (PIN), known only to the legitimate card holder, can be acquired by thieves by nefarious means to use a credit card or bank card fraudulently.

In general, it appears that all techniques for verifying the validity of a credit card or bank card (or any generalized document) relies on some form of embedded device in the document. There has been proposed that such sophisticated devices as holographic images, diffraction gratings, phosphorescent substances, optical fibers, and the like be incorporated in the document. These devices are generally fixed and invariable when incorporated in the document, and as such are available for a counterfeiter to examine, analyze, and duplicate. Eventually, the devices will become quantified, the standardized techniques that are adopted for machine reading the devices will become known, and counterfeiters will again be able to ply their illegal trade.

Thus as new security measures are created and adopted, it seems that new techniques are developed quickly to overcome these measures. There exists a need for a new card verification technique that cannot be counterfeited.

SUMMARY OF THE INVENTION

The present invention generally comprises a method and apparatus for document verification that prevents counterfeiting and unauthorized use of the document. In particular, the invention exploits a temporally variable physical process to generate a reproducible process that cannot be copied.

In accordance with the invention, a document such as a credit card, bank card, passport, or any item that is used to convey identification or authorization is provided with a spot or stripe that incorporates at least one, and preferably a large plurality of photorefractive crystals arrayed in a random manner. The document verifying apparatus includes a light source such as a diode laser to illuminate the photorefractive crystal(s), and a photosensor to receive light scattered from the photorefractive crystals. The signal from the photosensor is processed to identifying the document singularly and reliably.

The random orientation and distribution of the photorefractive crystal(s) during manufacture of the document comprises a unique characteristic for each card or document, and this characteristic is not based on any assigned number or code. Therefore, duplicating the document is virtually impossible. Also, there is no particular numerical designation associated with each photorefractive crystal locus, so that there is no number identification for a counterfeiter to derive from an existing card.

Moreover, the response of photorefractive crystals to the laser illumination comprises a time-varying characteristic that is dependent upon the intensity and temporal nature of the illumination itself. (Although laser illumination is mentioned throughout the specificaton, any light source that causes the photorefractive effect may be used.) Thus input to the laser illuminator may be varied to elicit differing responses from the photorefractive crystals, and this factor may be very difficult for a counterfeiter to ascertain. Also, for any given illumination intensity or temporal pattern, the image received by the photosensor varies with time. The time at which the photosensor signal is sampled to obtain an identifying image may also be varied, thereby further compounding the difficulty for a counterfeiter to overcome.

A large number of "snapshots" of the time-varying image of the document is captured, using any appropriate physical or electronic process, digitized, and stored in an electronic media. The photosensor signal is compared to the stored data; a match indicates a valid document, and no match indicates an invalid or unauthorized document. In addition, an image recognition process can be enhanced by comparing the rate of change in a sequence of images elicited by the laser illuminator.

BRIEF DESCRIPTION OF THE DRAWING

FIG. 1 is a plan view of an identification/authorization card embodying a photorefractive crystal verification stripe.

FIG. 2 is a magnified cross-sectional elevation of the photorefractive crystal verification stripe portion of the card of FIG. 1.

FIG. 3 is a perspective view depicting illumination of the photorefractive crystal verification stripe in the verification apparatus of the invention.

FIGS. 4 and 5 are a sequence of views depicting the time-varying response of the photorefractive crystals locus of a document in response to illumination.

FIG. 6 is a functional block diagram of the document verification apparatus of the invention.

DESCRIPTION OF THE PREFERRED EMBODIMENT

The present invention generally comprises a method and apparatus for document verification that prevents counterfeiting and unauthorized use of the document. The invention makes use of the photorefractive effect exhibited by some crystals, such as lithium niobate ($LiNbO_3$). When a laser beam or other coherent light source is directed through a photorefractive crystal, at first the beam passes through the crystal undisturbed. After a brief time, the crystal begins to distort the beam, scattering light in many directions. This effect is due to the fact that the laser beam alters the optical properties of the crystal itself. This effect, the photorefractive effect, may persist in the crystal for a period that varies from milliseconds to years. If the crystal is bathed in uniform light, it will recover rapidly and the photorefractive effect will disappear until the crystal is again illuminated by a laser beam.

In photorefractive crystals, electric charges diffuse away from bright regions and accumulate in dark regions. As more electric charges are displaced, the electric field inside the crystal increases, attaining a strength as high as 10,000 volts per centimeter. The electric field will distort the crystal lattice sufficiently to modify the refractive index of the crystal. The time required for light to rearrange charges in a crystal depends on the intensity of light and also on the mobility of the charges in the crystal, and is approximately inversely proportional to the intensity of the laser beam. The temporal variation of the photorefractive effect may be controlled by varying the intensity of the laser beam.

The source of the electric charges within a photorefractive crystal lies in defects in the crystal lattice, or mechanical flaws in the lattice structure, or foreign atoms (dopants) intentionally introduced into the lattice. Very small amounts of these defects, on the order of parts per million, are sufficient to cause the photorefractive effect. Charge mobility is created by electrons or holes moving in the lattice. If light illuminates charges on one region of a crystal, it will activate trapped charges and render them mobile. They will diffuse away from the illuminated region and accumulate in dark regions. Each charge that moves inside the crystal leaves behind an immobile charge of the opposite sign. In regions lying between positive and negative regions, the electric field is strongest, and creates the greatest distortion of the crystal lattice.

Any crystal defect that scatters light produces a spherical wave that interferes with the original coherent beam. The resulting interference pattern creates light and dark regions within the crystal, creating localized refractive changes. The net effect is a rapid buildup of complicated scattering patterns. The complexity of these optical patterns and their variations over time, which are unique to each photorefractive crystal, are exploited in the present invention to create a tamper-proof identification label which cannot be duplicated or counterfeited.

With regard to FIGS. 1 and 2, the apparatus of the invention includes a document 11, such as a credit card or bank card, that may include alphanumeric indicia 12 and a conventional magnetic stripe 13, known in the prior art. The document 11 further includes a stripe 14 incorporating one or more photorefractive crystals. The stripe may be formed by mixing the crystals within a carrier liquid and printing, spraying, painting, or otherwise applying the carrier to the document. Thereafter, a transparent protective layer 16 (such as polyethylene or the like) is applied over the stripe 14 to prevent disruption or abrasion of the photorefractive crystals. The size of the crystals is generally less than the thickness of the document 11 (approximately 0.5 mm) and greater than the wavelength of light used to stimulate and read the crystals (approximately 0.01 mm). Thus a large plurality of crystals are incorporated in the stripe 14. It is significant that the distribution and orientation of the large plurality of crystals embedded in the stripe 14 is entirely random; the number of crystals and the potential variations in their orientations assures that each stripe 14 is a unique crystal layout among many millions of possible documents.

With regard to FIG. 3, the apparatus further includes document reader or verifier having a source of a coherent beam of electromagnetic radiation, such as a diode laser 17. (Alternatively, an array of microlasers may be used as an illumination source.) The laser 17 is arranged to direct a beam of coherent light 18 toward the stripe 14, thereby eliciting the photorefractive effect that causes scattering of light rays from the stripe 14. A diode laser is used because it is a rugged, reliable, inexpensive source of coherent radiation, it is readily operated in pulsed or continuous mode, and the intensity of a diode laser beam may be selectively varied with great precision. A photosensor 21 is arranged to receive the scattered light rays 19 from the stripe 14. The photosensor 21 may comprise an array of photodiodes, a linear charge coupled device, or an imaging area charge coupled device. The scattered light rays form stochastic images that are dependent on the number, nature, and orientation of the photorefractive crystals illuminated by the beam 18. In addition, the stochastic images are dependent upon the intensity of the beam 18, and the time difference between illumination of the photorefractive crystals and sampling of the image by the sensor 21.

For example, with reference to FIG. 4, at a time $t=t_1$ the laser beam 18 will create a specular reflection 18' from the stripe 14, and the photorefractive effect will create a plurality of scattered rays 19. Some of the rays 19 fall on the photosensor 21 and compose a stochastic image that is characteristic of the photorefractive crystals illuminated by the beam 18. This image may be recorded by the photosensor 21 for subsequent processing. At a time $t=t_n$ (shown in FIG. 5, the illumination of the beam 18 alters the photorefractive effect and causes a change in the scattering characteristic of the crystals. As a result, a different combination of scattered rays 19 are received by the photosensor 21, creating a new stochastic image.

Clearly, the illumination intensity and temporal characteristics of the laser beam may be selectively controlled, and the number and temporal spacing of the images received by the photosensor 21 may be predetermined, or altered, as desired, to create a unique reading system.

With regard to FIG. 6, one configuration of the document reading system of the invention includes a microprocessor 31 and an associated memory 32, which may comprise a magnetic, optical, or electronic data storage medium. The microprocessor 31 is connected to a laser power supply 33 which drives the laser diode 17 described previously. A photosensor signal buffer 34, which is connected to the photosensor 21, is also connected to the microprocessor 31. The microprocessor 31 operates under program control to drive the laser power supply to operate the laser diode 17 to produce illumination of selected intensity and temporal variations, and samples the signal from the photosensor signal buffer 34 at selected times to acquire stochastic image information from the photosensor 21. The microprocessor may compare individual images in digital format with image data stored in the memory 32; a positive comparison results in a positive verification output signal, and lack of correspondence between the acquired image date and stored image date results in rejection of the document being processed in the reader system. Alternatively, the microprocessor may calculate the difference between two or more images from the buffer 34, thereby reducing the data set required to characterize a document, and use the difference data to carry out a comparison to stored data.

Other image processing and data processing techniques known in the prior art may be used to determine the validity or invalidity of the document bearing the photorefractive crystal stripe 14. For example, image comparison may be achieved in analog mode, using operational amplifiers connected in subtracting fashion and joined to a signal comparator. Likewise, analog or digital comparisons may be conducted outside the card reader, using data transmission to distant comparison devices.

Moreover, the image data or image difference data may be used as an encryption key. Each time the card is used and read, transmission to an electronic database may be encrypted using the unique temporal characteristics of the card itself. After a transmission is completed, the encryption key is erased immediately in the database bank, thus insuring internal security of data transmission.

In addition, the image recognition process can be carried out by deriving and comparing the rate of change in a sequence of images sampled from the photosensor, instead of the differences in two or more images. This feature may be combined with comparison techniques described previously to further confound would-be copiers and counterfeiters.

It should be noted that although a stripe of photorefractive crystals has been described, it may be noted that only a portion or sector of the stripe may be read by the apparatus described herein for verification purposes. Each portion of the stripe approximately the size of the spot width of the laser beam may comprise a unique identifying label for the card or document, and the choice of the stripe portion may comprise a further variable to confound counterfeiters and copiers.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

We claim:

1. A method for identification of an object, including the steps of;

applying a labeling spot on the object, said labeling spot including at least one photorefractive crystal:

illuminating said labeling spot with coherent light to elicit photorefractive changes in said photorefractive crystal;

imaging the light scattered from said photorefractive crystal to create an image corresponding to said photorefractive crystals, and, comparing said image to a database of image data to determine correspondence of said image with a valid identification image.

2. The method for object identification of claim 1, wherein said step of illuminating said labeling spot includes varying the intensity of said coherent light directed on said labeling spot.

3. The method for object identification of claim 1, wherein said step of illuminating said labeling spot includes pulsing said coherent light directed on said labeling spot.

4. The method for object identification of claim 1, wherein said imaging step includes sampling said scattered light at discrete time intervals to create a series of images of light scattered from said photorefractive crystal.

5. The method for object identification of claim 4, further including the step of selectively comparing at least one of said images to said database of image data.

6. The method for object identification of claim 4, further including the step of deriving image difference data between at least two of said series of images, and comparing said difference data to a database of difference data information.

7. The method for object identification of claim 1, further including the step of applying a stripe incorporating a plurality of photorefractive crystals to the surface of the object, wherein said labeling spot comprises a portion of said stripe.

8. A card for conveying identification information, including;

a planar card base having a first surface;

a labeling mark placed on said first surface, said labeling mark including a plurality of photorefractive crystals randomly distributed within said mark.

9. The identification card of claim 8, further including a transparent layer extending over said labeling mark to protect said plurality of photorefractive crystals from mechanical abrasion or disruption.

10. The identification card of claim 8, wherein said labeling spot comprises a portion of a stripe extending on said first surface of said card base.

11. A system for verifying the identity of an object, including;

a labeling mark applied to said object, said labeling mark including a plurality of photorefractive crystals;

a reading system for identifying and distinguishing a plurality of said labeling marks, said reading system including means for directing a beam of coherent light toward said labeling mark on said object to elicit photorefractive effects in said plurality of photorefractive crystals, means for imaging light scattered from said photorefractive crystals to create an image corresponding to said photorefractive crystals, and means for comparing said image to a database of valid images.

12. The identity verification system of claim 11, wherein said plurality of photorefractive crystals are randomly distributed in said labeling mark.

13. The identity verification system of claim 12, wherein said labeling mark comprises a portion of a stripe applied to a surface of said object.

14. The identity verification system of claim 11, wherein said means for directing a beam of coherent light comprises a diode laser.

15. The identity verification system of claim 12, further including means for varying the intensity and temporal activation of said laser diode.

16. The identity verification system of claim 11, wherein said means for imaging includes photosensor means disposed to receive said scattered light and generate an image signal corresponding to said image falling on said photosensor means.

17. The identity verification system of claim 16, wherein said photosensor means comprises an area charge coupled device.

18. The identity verification system of claim 16, wherein said photosensor means comprises a linear photodetector.

19. The identity verification system of claim 16, further including means for sampling said image signal at discrete time intervals to create a series of images depicting changes in said photorefractive effect over time.

20. The identity verification system of claim 19, further including means for comparing at least one of said series of images to said database of valid images.

21. The identity verification system of claim 19, further including means for deriving image difference data between at least two of said series of images, and comparing said image difference data to a database of difference data information.

22. The identity verification system of claim 19, further including means for transmitting data to a central control station, and means for encrypting said data for transmission using an encryption key derived from at least one of said series of images.

23. The identity verification system of claim 19, further including means for transmitting data to a central control station, and means for encrypting said data for transmission using an encryption key derived from said image difference data.

* * * * *